United States Patent
Hallman et al.

(10) Patent No.: US 6,678,887 B1
(45) Date of Patent: Jan. 13, 2004

(54) CUSTOMIZING BUSINESS LOGIC AND DATA SOURCES BY MODIFYING METHODS DEFINED WITHIN AN API

(75) Inventors: Clinton J. Hallman, San Jose, CA (US); David Forney, Cupertino, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 507 days.

(21) Appl. No.: 09/613,653

(22) Filed: Jul. 11, 2000

(51) Int. Cl.[7] ................................. G06F 9/44
(52) U.S. Cl. .................... 717/162; 717/171; 717/176
(58) Field of Search ........................... 717/162, 171, 717/176; 707/171

(56) References Cited

U.S. PATENT DOCUMENTS

| 6,021,410 | A | * | 2/2000 | Choy ..................... 707/103 R |
| 6,101,502 | A | * | 8/2000 | Heubner et al. ......... 707/103 R |
| 6,182,142 | B1 | * | 1/2001 | Win et al. .................. 709/229 |
| 6,321,374 | B1 | * | 11/2001 | Choy .......................... 717/106 |
| 6,412,071 | B1 | * | 6/2002 | Hollander et al. .......... 713/200 |

OTHER PUBLICATIONS

IBM Dictionary of Computing, Geroge Mc Daniel, p. 255, published 1994.*
IBM Technical Disclosure Bulletin, vol 31, no 1, Jun. 1988, pp. 294–298.*

* cited by examiner

Primary Examiner—Todd Ingberg
(74) Attorney, Agent, or Firm—Silicon Valley IP Group, PC; Kevin J. Zilka; Christopher J. Hamaty

(57) ABSTRACT

A system that facilitates customizing a software package by modifying an implementation of a target method defined within an application programming interface (API) for the software package is presented. The system operates by receiving additional code for integration into a target method defined within the API and a command to integrate this code, wherein the API defines a plurality of methods that operate on objects. This command is received through a pre-defined method within the API. In response, the system links the additional code into the target method so that the additional code is executed upon invocation of the target method. In one embodiment the API defines: a method that creates an object; a method that deletes the object; a method that fetches the object; and a method that updates the object. In one embodiment the additional code causes the target method to operate on data from an alternative source.

24 Claims, 3 Drawing Sheets

DISTRIBUTED COMPUTING SYSTEM 100

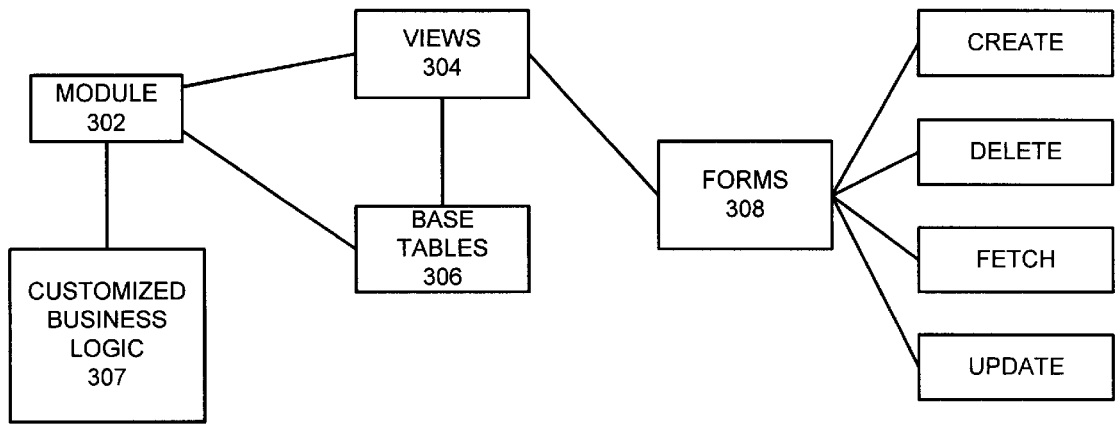

FIG. 3

```
CREATE ( ){                    ← PRECREATE( )
      PRECREATE CODE;
      DEFAULT CODE;            ← CREATESOURCE( )
      POSTCREATE CODE;
}                              ← POSTCREATE( )

DELETE( ){                     ← DELETE( )
      PREDELETE CODE;
      DEFAULT CODE;            ← DELETESOURCE( )
      POSTDELETE;
}                              ← POSTDELETE( )

FETCH( ){                      ← PREFETCH( )
      PREFETCH CODE;
      DEFAULT CODE;            ← FETCHSOURCE( )
      POSTFETCH CODE;
}                              ← POSTFETCH( )

UPDATE( ){                     ← PREUPDATE( )
      PREUPDATE CODE;
      DEFAULT CODE;            ← UPDATESOURCE( )
      POSTUPDATE CODE;
}                              ← POSTUPDATE( )
```

FIG. 4

CUSTOMIZING BUSINESS LOGIC AND DATA SOURCES BY MODIFYING METHODS DEFINED WITHIN AN API

BACKGROUND

1. Field of the Invention

The present invention relates to application programming interfaces (APIS) for computer systems. More specifically, the present invention relates to a method and an apparatus for modifying an application by customizing methods defined within an API for the application to include additional business logic and/or to specify additional data sources.

2. Related Art

As businesses scramble to exploit the potential efficiencies that arise through the use of information technology, numerous business processes are becoming computerized. This trend has led to an explosion in the development of software packages to facilitate specific business processes. Unfortunately, organizations are typically unable to make use of off-the-shelf applications to facilitate a specific business process because the requirements of a specific business process are typically dictated by requirements of a specific type of business and a specific organizational structure. Hence, a business is typically forced to develop its own software package for a specific business process. This typically entails employing expensive teams of programmers and/or consultants to develop, debug and maintain the software package.

The process of developing a software package can consume a great deal of time and can distract management from focussing on the main line of a business. Furthermore, a software package must be continually maintained and updated, which can require additional commitments of time and financial resources.

For example, a company may want to design a software package to facilitate a "help desk" for computer system support. A completely off-the-shelf help desk system is typically not practical to use because different organizations have different requirements. For example, one company may want to tie a help desk system into a specific inventory database to keep track of parts that are used in fixing a computer system. Another company may want to use the help desk system to facilitate automatic purchasing for parts. Yet another company may want to use the help desk system to track equipment faults.

However, note that building a completely new software system from the ground up for each company is wasteful because many elements of a help desk system can be shared between different organizations.

Hence, what is needed is a method and an apparatus that facilitates customizing an off-the-shelf software system to fulfill specific requirements of a specific business process for a specific organization.

SUMMARY

One embodiment of the present invention provides a system that facilitates customizing a software package by modifying an implementation of a target method defined within an application programming interface for the software package. The system operates by receiving additional code to be integrated into a target method defined within the application programming interface, wherein the application programming interface defines a plurality of methods that operate on objects. The system also receives a command to integrate the additional code into the target method within the application programming interface. This command is received through a pre-defined code integration method within the application programming interface. In response to this command, the system links the additional code into the target method within the application programming interface so that the additional code is executed when the target method is invoked.

In one embodiment of the present invention, the application programming interface defines: a method that creates an object; a method that deletes the object; a method that fetches the object; and a method that updates the object.

In one embodiment of the present invention, the object includes: an object associated with a help desk; an object associated with a client of the help desk; an object associated with a support staff member associated with the help desk; an object associated with an inventory item for the help desk; and an object associated with a subject of a help desk ticket.

In one embodiment of the present invention, the additional code causes the target method to operate on data from an alternative data source.

In one embodiment of the present invention, the pre-defined code integration method integrates the additional code so that it is executed prior to executing default code for the target method.

In one embodiment of the present invention, the pre-defined code integration method integrates the additional code so that it is executed after executing default code for the target method.

In one embodiment of the present invention, the application programming interface is implemented in a middle tier of a three-tier distributed computing architecture, which includes: a client tier for interacting with users; the middle tier for performing business logic functions; and a database tier for storing data.

In one embodiment of the present invention, the application programming interface is defined within a common object model (COM) object.

BRIEF DESCRIPTION OF THE FIGURES

FIG. 3 illustrates structures related to a module in accordance with an embodiment of the present invention.

FIG. 4 illustrates how several methods are implemented so they can be modified in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
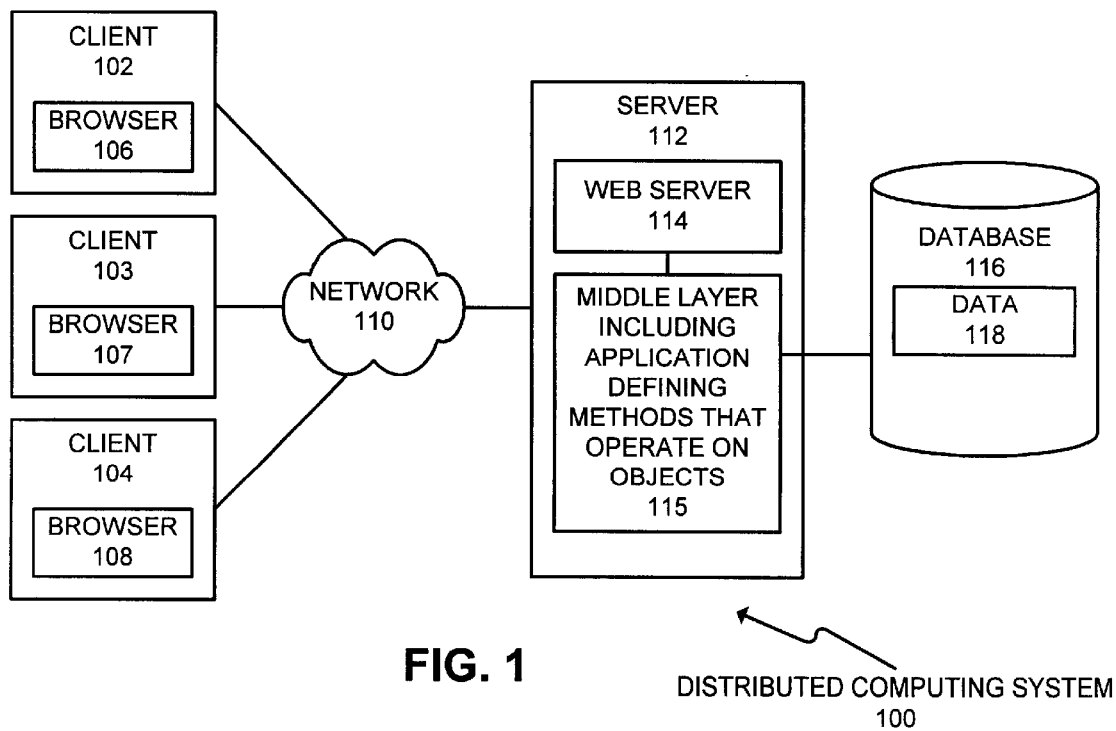
FIG. 1 illustrates a distributed computing system in accordance with an embodiment of the present invention.

FIG. 1 illustrates a distributed computing system 100 in accordance with an embodiment of the present invention. Distributed computing system 100 includes clients 102–104, which are coupled with server 112 through network 110. Network 110 can include any type of wire or wireless communication channel capable of coupling together computing nodes. This includes, but is not limited to, a local area network, a wide area network, or a combination of networks. In one embodiment of the present invention, network 110 includes the Internet.

Server 112 can include any computational node with a mechanism for servicing requests from a client for computational or data storage resources. Note that server 112 includes web server 114. Web server 114 acts as a host for at least one web site that provides web pages for browsers that communicate with web server 114. Web server 114 communicates with middle layer 115, which includes an application (such as a help desk) with an application programming interface (API) defining a number of methods that operate on objects associated with the application. For example a help desk application can operate on objects associated with, a help desk, a client of the help desk, support staff for the help desk, inventory associated with the help desk and purchasing transactions for the help desk.

Note that middle layer 115 is the middle layer in a three-tier architecture. The top tier of the architecture (which is often referred to as the client) typically performs user interface functions. This top tier includes browsers 106–108 as well as web server 114. The middle tier includes middle layer 115 and typically performs business logic functions. The bottom tier includes database 116 and typically stores data.

Middle layer 115 within server 112 communicates with database 116. Database 116 contains data 118 that is accessed by web server 114 and middle layer 115. In one embodiment of the present invention, database 116 is located on the same computational node as server 112. In another embodiment, database 116 is located on a separate computational node from server 112, and communications between server 112 and database 116 take place across a network, such as network 110.

Clients 102–104 can include any node on network 110 including computational capability and including a mechanism for communicating across network 110 to request services from a server, such as server 112.

Note that clients 102–104 contain browsers 106–108, respectively. Browsers 106–108 can include any type of browser for viewing web pages supplied by web server 114 on server 112. For example, browsers 106–108 can include a version of the Internet Explorer browser produced by the Microsoft Corporation of Redmond, Wash.

Although the present invention is described in the context of distributed computing system 100 as is illustrated in FIG. 1, the present invention can generally be applied to any type of computer system upon which an application with an API can operate. Hence, the present invention is not limited to a distributed computing system that employs web servers and web browsers as is illustrated in FIG. 1.

Middle-Tier Server

Figure 2:
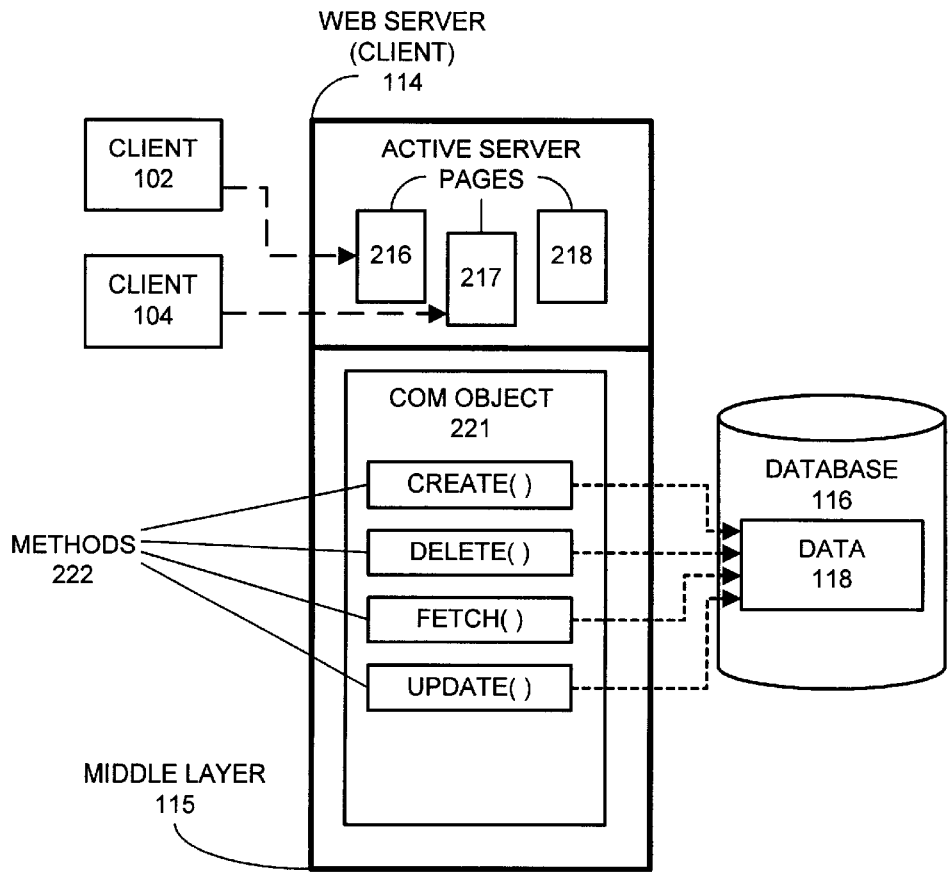
FIG. 2 illustrates the structure of a web server and a middle layer in accordance with an embodiment of the present invention.

FIG. 2 illustrates the structure of web server 114 and middle layer 115 from FIG. 1 in accordance with an embodiment of the present invention. Web server 114 includes active server pages (ASPs) 216–218, which communicate with common object model (COM) object 221 in middle layer 115. In one embodiment of the present invention, ASPs 216–218 are defined within the Internet Information Server (IIS) that is distributed by the Microsoft Corporation of Redmond, Wash.

COM object 221 contains interfaces for methods such as "create," "delete," "fetch," and "update." In performing these methods, COM object 221 takes in parameters specifying an object to be operated on, data involved in the operation, and an action to be performed using the data. Note that COM object 221 can be accessed by different ASPs 216 and 217 that are associated with different clients 102 and 104. This allows clients 102 and 104 to share the same COM object 221, which can greatly reduce memory usage within server 112. Note that COM object 221 also communicates with database 116 to manipulate data 118.

Web server 114 operates generally as follows. Clients 102 and 104 communicate with ASPs 216 and 217, respectively, within web server 114. Clients 102 and 104 cause server-side scripts within ASPs 216 and 217 to be triggered. These server-side scripts cause operations to be performed by COM object 221.

In order to allow incorporate additional business logic into an application, such as a help desk, the methods create, delete, fetch and update defined within COM object 221 can be modified as is described below with reference to FIGS. 4 and 5.

Structures Related to a Module

FIG. 3 illustrates structures related to a module 302 in accordance with an embodiment of the present invention. Note that module 302 can exist for each entity that operated on by an application. For example, a help desk application can include modules for: a help desk, a help desk client, a subject of the help desk, support staff for the help desk, inventory for the help desk and purchasing transactions for the help desk.

Module 302 is associated with a number of views 304 of underlying base tables 306 stored within database 116. Note that different sets of views can be associated with different groups.

Various forms 308 for viewing and entering data can be associated with various views. For example, FIG. 3 illustrates forms for the methods create, fetch, update and delete. These forms call the methods create( ), fetch( ), update( ) and delete( ) of module 302.

Module 302 is also associated with customized business logic 307 that customizes the operation of methods associated with module 302. Module 302 can use views 304 and base tables 306, equivalently, to access and modify data. Furthermore, customized business logic 307 can override or work alongside of the default logic of a generically implemented module 302 to access views 304, base tables 306, third party databases or other third party systems.

Method Structure

FIG. 4 illustrates how several methods are implemented so they can be modified in accordance with an embodiment of the present invention. These methods includes create, delete, fetch and update.

There are three ways in which each of these methods can be modified. (1) Pre-processing code can be added before default code for the method. (2) Post-processing code can be added after default code for the method. (3) Code can be added to specify a new data source for the method.

For example, the methods precreate, predelete, prefetch and preupdate can be used to link additional code into the methods create, delete, fetch and update, respectively, before the default code for the methods.

Similarly, the methods postcreate, postdelete, postfetch and postupdate can be used to link additional code into the methods create, delete, fetch and update, respectively, after the default code for the methods.

Also, the methods createsource, deletesource, fetchsource and updatesource can be used to update a data source that is used by the default code for the methods or to substitute new code for the default code. For example, the method fetchsource can be called to switch the data source from a local database to a remote database located across a network.

Note that the above-described methods for modifying the methods create, delete, fetch and update are defined within an API for the application. This allows the application to be easily modified to include new business logic or to operate on data from a different data source. Also note that code that calls the methods create, delete, fetch and update does not have to be modified, because the additional functionality is incorporated into the implementation of these methods.

Process of Modifying a Method

Figure 5:
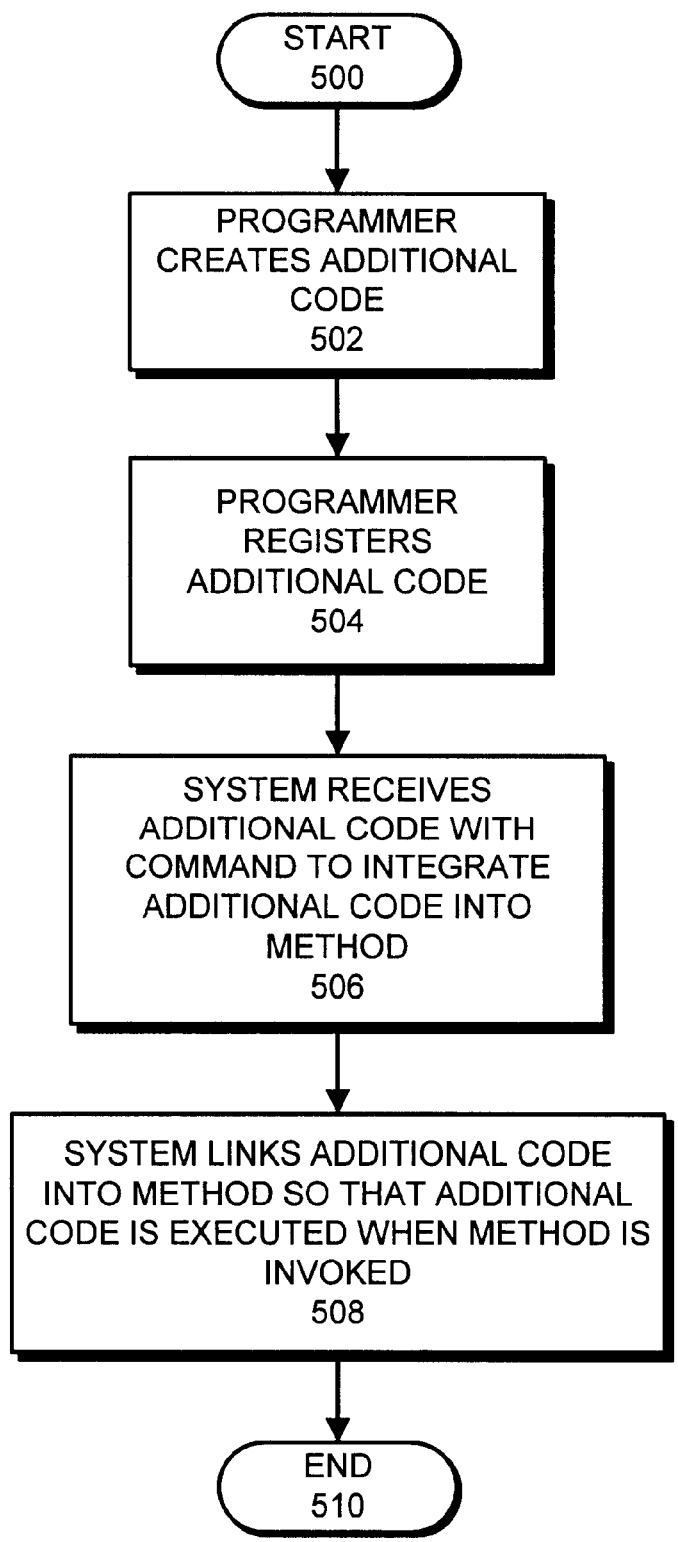
FIG. 5 is a flow chart illustrating the processing of incorporating additional code into a method in accordance with an embodiment of the present invention.

FIG. 5 is a flow chart illustrating the processing of incorporating additional code into a method in accordance with an embodiment of the present invention. A programmer desiring to modify an application first creates additional code containing additional business logic to be incorporated into one of the methods (create, delete, fetch or update) involved in the application (step 502). Next, the programmer registers this additional code with the system by invoking one of the predefined code integration methods, precreate, predelete, prefetch, preupdate, createsource, deletesource, fetchsource, updatesource, postcreate, postdelete, postfetch and postupdate (step 504).

When a predefined code integration method is called, the system receives the additional code along with the command to integrate the additional code into the method (step 506).

Next, system links the additional code into the target method so that the additional code is executed whenever the target method is executed (step 508).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modifying a software package by customizing an implementation of a target method defined within an application programming interface for the software package, comprising:

receiving additional code to be integrated into the target method defined within the application programming interface;

wherein the application programming interface defines a plurality of methods that operate on objects associated with the software package;

receiving a command to integrate the additional code into the target method;

wherein the command is received through a pre-defined code integration method that already exists within the application programming interface and is used for integrating additional code into the target method within the application programming interface;

wherein the integrating of the additional code into the target method includes a step selected from a group consisting of: (i) adding preprocessing code before default code for the target method, (ii) adding post-processing code after the default code for the target method, and (iii) adding code to specify a new data source for the target method; and linking the additional code into the target method within the application programming interface so that the additional code is executed when the target method is invoked.

2. The method of claim 1, wherein the application programming interface defines:

a method that creates an object;

a method that deletes the object;

a method that fetches the object; and a method that updates the object.

3. The method of claim 1, wherein the additional code causes the target method to operate on data from an alternative data source.

4. The method of claim 1, wherein the predefined code integration method integrates the additional code so that it is executed prior to executing default code for the target method.

5. The method of claim 1, wherein the predefined code integration method integrates the additional code so that it is executed after executing default code for the target method.

6. The method of claim 1, wherein the application programming interface is implemented in a middle tier of a three-tier distributed computing architecture, which includes:

a client tier for interacting with users;

the middle tier for performing business logic functions; and a database tier for storing data.

7. The method of claim 6, wherein the object includes one of:

an object associated with a help desk;

an object associated with a client of the help desk;

an object associated with a support staff member associated with the help desk;

an object associated with an inventory item for the help desk; and an object associated with a subject of a help desk ticket.

8. The method of claim 1, wherein the application programming interface is defined within a common object model (COM) object.

9. A computer-readable storage medium storing instructions that when executed by a computer cause the computer to perform a method for modifying a software package by customizing an implementation of a target method defined within an application programming interface for the software package, the method comprising:

receiving additional code to be integrated into the target method defined within the application programming interface;

wherein the application programming interface defines a plurality of methods that operate on objects associated with the software package;

receiving a command to integrate the additional code into the target method;

wherein the command is received through a pre-defined code integration method that already exists within the application programming interface and is used for integrating additional code into the target method within the application programming interface;

wherein the integrating of the additional code into the target method includes a step selected from a group consisting of: (i) adding pre-processing code before default code for the target method, (ii) adding post-processing code after the default code for the target method, and (iii) adding code to specify a new data source for the target method; and linking the additional code into the target method within the application programming interface so that the additional code is executed when the target method is invoked.

10. The computer-readable storage medium of claim 9, wherein the application programming interface defines:

a method that creates an object;

a method that deletes the object;

a method that fetches the object; and a method that updates the object.

11. The computer-readable storage medium of claim 10, wherein the object includes one of:

an object associated with a help desk;

an object associated with a client of the help desk;

an object associated with a support staff member associated with the help desk;

an object associated with an inventory item for the help desk; and an object associated with a subject of a help desk ticket.

12. The computer-readable storage medium of claim 9, wherein the additional code causes the target method to operate on data from an alternative data source.

13. The computer-readable storage medium of claim 9, wherein the predefined code integration method integrates the additional code so that it is executed prior to executing default code for the target method.

14. The computer-readable storage medium of claim 9, wherein the predefined code integration method integrates the additional code so that it is executed after executing default code for the target method.

15. The computer-readable storage medium of claim 9, wherein the application programming interface is implemented in a middle tier of a three-tier distributed computing architecture, which includes:

a client tier for interacting with users;

the middle tier for performing business logic functions; and a database tier for storing data.

16. The computer-readable storage medium of claim 9, wherein the application programming interface is defined within a common object model (COM) object.

17. A apparatus that facilitates modifying a software package by customizing an implementation for a target method defined within an application programming interface for the software package, comprising:

the software package;

the application programming interface, within the software package, that defines a plurality of methods that operate on objects associated with the software package;

a pre-defined code integration method, already existing within the application programming interface, wherein the pre-defined code is configured to integrate additional code into a target method within the application programming interface; and a linking mechanism, within the predefined code integration method, that is configured to link the additional code into the target method within the application programming interface so that the additional code is executed when the target method is invoked;

wherein the pre-defined code that integrates the additional code into the target method includes at least one of: (i) code for adding pre-processing code before default code for the target method, (ii) code for adding post-processing code after the default code for the target method, and (iii) code for adding code to specify a new data source for the target method.

18. The apparatus of claim 17, wherein the application programming interface defines:

a method that creates an object;

a method that deletes the object;

a method that fetches the object; and a method that updates the object.

19. The apparatus of claim 18, wherein the object includes one of:

an object associated with a help desk;

an object associated with a client of the help desk;

an object associated with a support staff member associated with the help desk;

an object associated with an inventory item for the help desk; and an object associated with a subject of a help desk ticket.

20. The apparatus of claim 17, wherein the additional code causes the target method to operate on data from an alternative data source.

21. The apparatus of claim 17, wherein the predefined code integration method is configured to integrate the additional code so that it is executed prior to executing default code for the target method.

22. The apparatus of claim 17, wherein the predefined code integration method is configured to integrate the additional code so that it is executed after executing default code for the target method.

23. The apparatus of claim 17, wherein the application programming interface is implemented in a middle tier of a three-tier distributed computing architecture, which includes:

a client tier for interacting with users;

the middle tier for performing business logic functions; and a database tier for storing data.

24. The apparatus of claim 17, wherein the application programming interface is defined within a common object model (COM) object.

\* \* \* \* \*